(12) United States Patent
Diamant et al.

(10) Patent No.: US 11,947,694 B2
(45) Date of Patent: Apr. 2, 2024

(54) DYNAMIC VIRTUAL HONEYPOT UTILIZING HONEY TOKENS AND DATA MASKING

(71) Applicant: INTERNATIONAL BUSINESS MACHINES CORPORATION, Armonk, NY (US)

(72) Inventors: Galia Diamant, Lexington, MA (US); Richard Ory Jerrell, Goffstown, NH (US); Chun-Shuo Lin, Tainan (TW); Wei-Hsiang Hsiung, Taipei (TW); Cheng-Ta Lee, Chamblee, GA (US); Wei-Jie Liau, Taoyuan (TW)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 17/304,949

(22) Filed: Jun. 29, 2021

(65) Prior Publication Data
US 2022/0414245 A1 Dec. 29, 2022

(51) Int. Cl.
*H04L 9/40* (2022.01)
*G06F 21/62* (2013.01)

(52) U.S. Cl.
CPC ...... *G06F 21/6218* (2013.01); *H04L 63/1466* (2013.01); *H04L 63/1491* (2013.01); *H04L 63/20* (2013.01)

(58) Field of Classification Search
CPC .............. G06F 21/6218; G06F 21/554; H04L 63/1466; H04L 63/1491; H04L 63/20; H04L 63/145
See application file for complete search history.

(56) References Cited

U.S. PATENT DOCUMENTS 9,578,055 B1  2/2017  Khanal
10,462,181 B2  10/2019  Clark, III
(Continued)

FOREIGN PATENT DOCUMENTS

CN   110071931 A   7/2019
CN   111541670 A   8/2020

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Brian F Shaw
(74) *Attorney, Agent, or Firm* — Peter J. Edwards (57) ABSTRACT

A method, a computer program product, and a system for implementing a dynamic virtual database honeypot. The method includes relaying a query request received from a database client to a database and receiving, from the database, a response relating to the query request. The method also includes determining the query request is an attack on the database based on session information relating to the database and the database client, generating a honey token based on information contained within the response, generating an alternate response formatted in a same format as the response and containing artificial information that masks the information contained within the response. The method further includes inserting the honey token into the alternate response and transmitting the alternate response to the database client.

20 Claims, 6 Drawing Sheets

(56) References Cited

U.S. PATENT DOCUMENTS

| | | | |
|---|---|---|---|
| 2006/0074897 A1* | 4/2006 | Fergusson | G06F 16/335 |
| 2017/0134405 A1 | 5/2017 | Ahmadzadeh | |
| 2017/0324777 A1* | 11/2017 | Ohayon | H04L 63/1491 |
| 2018/0063191 A1 | 3/2018 | Woronka | |
| 2019/0116136 A1 | 4/2019 | Baudart | |
| 2020/0177556 A1* | 6/2020 | Subbarayan | G06N 20/00 |

OTHER PUBLICATIONS

Disclosed Anonymously, "System and Method of Virtual Fake Connection to Trace the Purpose of Attacking," Published Aug. 6, 2014, https://priorart.ip.com/IPCOM/000238162.

"Dynamic Data Masking—highlighting the latest improvements," published Oct. 22, 2015, https://docs.microsoft.com/en-us/archive/blogs/sqlsecurity/dynamic-data-maskinghighlighting-the-latest-improvements.

Glastopf 3.1.2, Web application honeypot, https://pypi.org/project/Glastopf/.

Honeytoken, printed from Wikipedia on Jun. 21, 2021, https://en.wikipedia.org/wiki/Honeytoken.

Muhammet Baykara, Resul Das, "A novel honeypot based security approach for real-time intrusion detection and prevention systems," Journal of Information Security and Applications, vol. 41, 2018, pp. 103-116, ISSN 2214-2126, https://doi.org/10.1016/j.jisa.2018.06.004.

Niels Provos, "A virtual honeypot framework," SSYM'04: Proceedings of the 13th conference on USENIX Security Symposium, vol. 13, Aug. 2004, https://dl.acm.org/doi/10.5555/1251375.1251376.

W. Fan, Z. Du, D. Fernández and V. A. Villagrá, "Enabling an Anatomic View to Investigate Honeypot Systems: A Survey," in IEEE Systems Journal, vol. 12, No. 4, pp. 3906-3919, Dec. 2018, doi: 10.1109/JSYST.2017.2762161, https://ieeexplore.iee.org/document/8098608.

* cited by examiner

DYNAMIC VIRTUAL HONEYPOT UTILIZING HONEY TOKENS AND DATA MASKING

BACKGROUND

The present disclosure relates to database security, and more specifically, to implementing a dynamic virtual honeypot using honey tokens and data masking to prevent potential attacks from accessing the data stored on a database.

Honeypots are computer security mechanisms that are set to detect, deflect, or, in some manner, counteract attempts at unauthorized use of a system (e.g., a database). Honeypots can consist of data that appears to be a legitimate part of the system and can contain information or resources of value to potential attackers. Honeypots can be used in a variety of ways, such as detecting attacks, capturing and analyzing automated attacks (e.g., a worm), act as early indicators and warning sensors, and the like.

A database is an organized collection of information, or data, typically stored electronically in a computer system. In general, databases can be either relational databases or non-relational databases. Relational databases use a structure (e.g., a table) that allows users to identify and access data in relation to other pieces of data in the database. Non-relational databases do not use a tabular scheme of rows and columns found in relational databases. Instead, non-relational databases use a storage model that is optimized for specific requirements of the type of data being stored.

SUMMARY

Embodiments of the present disclosure include a computer-implemented method of implementing a dynamic virtual database honeypot. The computer-implemented method includes relaying a query request received from a database client to a database and receiving, from the database, a response relating to the query request. The computer-implemented method also includes determining the query request is an attack on the database based on session information relating to the database and the database client and generating a honey token based on information contained within the response. The honey token can be generated based on a honey token generation policy predetermined by an administrator. The computer-implemented method also includes generating an alternate response formatted in the same format as the response and containing artificial information that masks the information contained within the response. The artificial response can be based on a redaction policy set to ensure that certain information is masked. The computer-implemented method further includes inserting the honey token into the alternate response and transmitting the alternate response to the database client.

Additional embodiments of the present disclosure include a computer program product of implementing a dynamic virtual database honeypot, one or more computer-readable storage medium, and program instructions stored on the one or more computer-readable storage media, the program instruction executable by a processor to cause the processor to perform a method. The method includes relaying a query request received from a database client to a database and receiving, from the database, a response relating to the query request. The method also includes determining the query request is an attack on the database based on session information relating to the database and the database client and generating a honey token based on information contained within the response. The honey token can be generated based on a honey token generation policy predetermined by an administrator. The method also includes generating an alternate response formatted in the same format as the response and containing artificial information that masks the information contained within the response. The artificial response can be based on a redaction policy set to ensure that certain information is masked. The method further includes inserting the honey token into the alternate response and transmitting the alternate response to the database client.

Further embodiments of the present disclosure include a system for implementing a dynamic virtual database honeypot. The system includes a memory, a processor, local data storage having stored thereon computer-executable code. The computer-executable code includes the program instruction executable by a processor to cause the processor to perform the method described above. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to database security, and more specifically, to implementing a dynamic virtual honeypot using honey tokens and data masking to prevent potential attacks from accessing the data stored on a database. While the present disclosure is not necessarily limited to such applications, various aspects of the disclosure may be appreciated through a discussion of various examples using this context.

A honeypot can be viewed as a closely monitored computing resource that is designed to be probed, attacked, or compromised by an authorized entity or attacker. More specifically, a honeypot can be an information resource whose value lies in unauthorized or illicit use of that resource. Analysts can monitor the data that enters and leaves a honeypot to gather the information that is not available to other security mechanisms such as network intrusion detection systems (NIDS). For instance, NIDS requires signatures of known attacks and can fail to detect compromises that were unknown at the time of deployment. On the other hand, honeypots can detect vulnerabilities that are not yet discovered or understood. For example, honeypots can be used to detect compromises by observing network traffic leaving the honeypot, even if the means of the exploit are yet known.

Typically, a honeypot can be either a physical honeypot or a virtual honeypot. A physical honeypot is a real machine on a network with a unique Internet Protocol (IP) address. A virtual honeypot is simulated by another machine that responds to network traffic sent to the virtual honeypot. Additionally, there are several different types of honeypots that can be deployed. These various types can be interchanged and mixed together to achieve a particular goal or goals. These types of honeypots include, but are not limited to, high-interaction honeypots, low-interaction honeypots, physical honeypots, and virtual honeypots.

Virtual honeypots can be useful as thousands of honeypots can be deployed on a single machine. Instead of deploying a physical computer system that acts as a honeypot, administrators can deploy a physical computer that can host several virtual machines that act as honeypots. For example, administrators can utilize services such as VMware or User-Made Linux (UML) to set up and operate virtual honeypots such as databases.

A database is an organized collection of information, or data, typically stored electronically in a computer system. In general, databases can be either relational databases or non-relational databases. Relational databases use a structure (e.g., a table) that allows users to identify and access data in relation to other pieces of data in the database. Non-relational databases do not use a tabular scheme of rows and columns found in relational databases. Instead, non-relational databases use a storage model that is optimized for specific requirements of the type of data being stored.

Organizations can use databases to store and retrieve data. The databases can then be queried to create, update, delete, and retrieve the data. Relational databases typically store data in the form of tables that consist of rows and columns. The tables can have relationships with other tables to depict the actual data relationships. For example, a school may have a student table related to a course table. Prior to storing data in a relational database, the data is structured to match a schema to allow for information to be easily identified and retrieved.

Non-relational databases store unstructured and semi-structured data without enforcing a structure to the data before being stored. The data stored in non-relational databases can vary depending on the provider, but generally, data is stored as documents instead of tables. An example of this would be databases for inventory management, where different products have different attributes and, therefore, require a flexible structure. Similarly, an analytics database stores data from different sources in different structures.

Limitations on database honeypots remain, however, as current implementations can be detected by attackers based on the volume and/or the schema of the database honeypot. Techniques such as replicating entire databases can result in high cost and large production in order to establish the honeypot. Additionally, there is a risk that the actual information stored on the honeypot will be compromised by a potential attacker. Additionally, if a database protection solution (DPS) is implemented, attackers may use known techniques to discover it on the database honeypot and take steps to circumvent the DPS or avoid the honeypot altogether.

Existing solutions, using traditional honeypot techniques, are designed to route different traffic to different honeypots based on the type of traffic and request. Physical honeypots are often times too intensive and expensive as different operating systems require specialized hardware, and each honeypot requires its own physical system. Virtual honeypots can be deployed to simulate the network stack of different operating systems and can provide arbitrary routing topologies and services for an arbitrary number of virtual systems. However, designing a production-like database honeypot schema is difficult to accomplish that can convince potential attackers.

Embodiments of the present disclosure may overcome the above, and other problems, by using a dynamic virtual honeypot framework utilizing honey tokens and dynamic data masking. The dynamic virtual honeypot framework can act as the honeypot to transmit a honey token to an attacker so that the honey token can be analyzed to potentially reveal the actions of the attacker. Compared to traditional databases, which require identifying the attack in the query request stage to redirect the request to the honeypot, the dynamic virtual honeypot framework can defer the decision to the response receiving stage. By deferring the decision, precision when transmitting the honey token can be improved.

More specifically, the dynamic virtual honeypot framework includes a set of redaction rules that can be triggered when an attack is detected. The virtual honeypot can mimic production data and provide artificial responses to mislead attackers without the cost of maintaining a separate honeypot service or system. Additionally, the artificial data created by the dynamic virtual honeypot framework can be unique to the specific attack. Thus, when the artificial data is sold by a specific account on the Internet, for example, the data contained can be correlated with the information saved at the time of the attack to determine which attack stole the artificial data. The artificial data can be a key factor that can additionally correlate potential attacker information with that of a hacker account.

In some embodiments, the dynamic virtual honeypot framework includes a honey token generation policy. The honey token generation policy can be a predetermined ruleset for what information can be categorized as the honey token. For example, if the response from the database includes credentials, then the honey token can replace that sensitive information with workable credentials that are specific to the honeypot. This allows the attacker to believe that the information they are receiving is legitimate while also allowing that information to be tracked as it is being used. In some embodiments, the honey token generation policy may dictate what honey token is used based on the response received by the database. For example, the response may include various pieces of information, and the policy can dictate that the information that is most easily trackable to be set as the honey token, such as an email address or name.

In some embodiments, the dynamic virtual honeypot framework analyzes the response received from the database to generate a response format that is like that of the original response. This allows the dynamic virtual honeypot to mask the actual data and prevent the attacker from receiving the sensitive information. Additionally, artificial data that the dynamic virtual honeypot framework produces can have a similar format as the actual response. Thus, an attacker would be less likely to be suspicious of the response as the information they are receiving resembles the information they expect to receive from their database request.

In some embodiments, the dynamic virtual honeypot framework utilizes a set of redaction rules to mask the information received in the response from the database. The redaction rules may indicate that any sensitive information contained within the response must be masked and converted into artificial information that resembles the sensitive information, but not the actual information. For example, the query response may contain the name "John Smith" with a social security number of "123-45-6789". The dynamic virtual honeypot framework can mask that information by changing the value but keeping the format the same. For example, the dynamic virtual honeypot framework may change the name to "Tina Thompson" with a social security number of "444-55-0092". The computer-generated information can be artificial while still convincing the attacker that they have legitimate information.

In some embodiments, the dynamic virtual honeypot framework inserts the honey token into the artificial data response. Once the honey token is generated based on the actual response from the database and the honey token generation policy, the honey token can then be inserted into the artificial response so that it resembles information stored in the response. For example, if the response has an email, then the honey token may be an email as well and can replace the other email. The honey token can then be tracked to assist in potentially identifying the attacker and/or the method of attack.

In some embodiments, multiple honey tokens are inserted into the alternate response. For example, a honey token can be created for an email address as well as workable credentials. Both honey tokens can be inserted into the artificial response so as to assist in tracking the information if and when the attacker disperses the stolen information.

Figure 1:
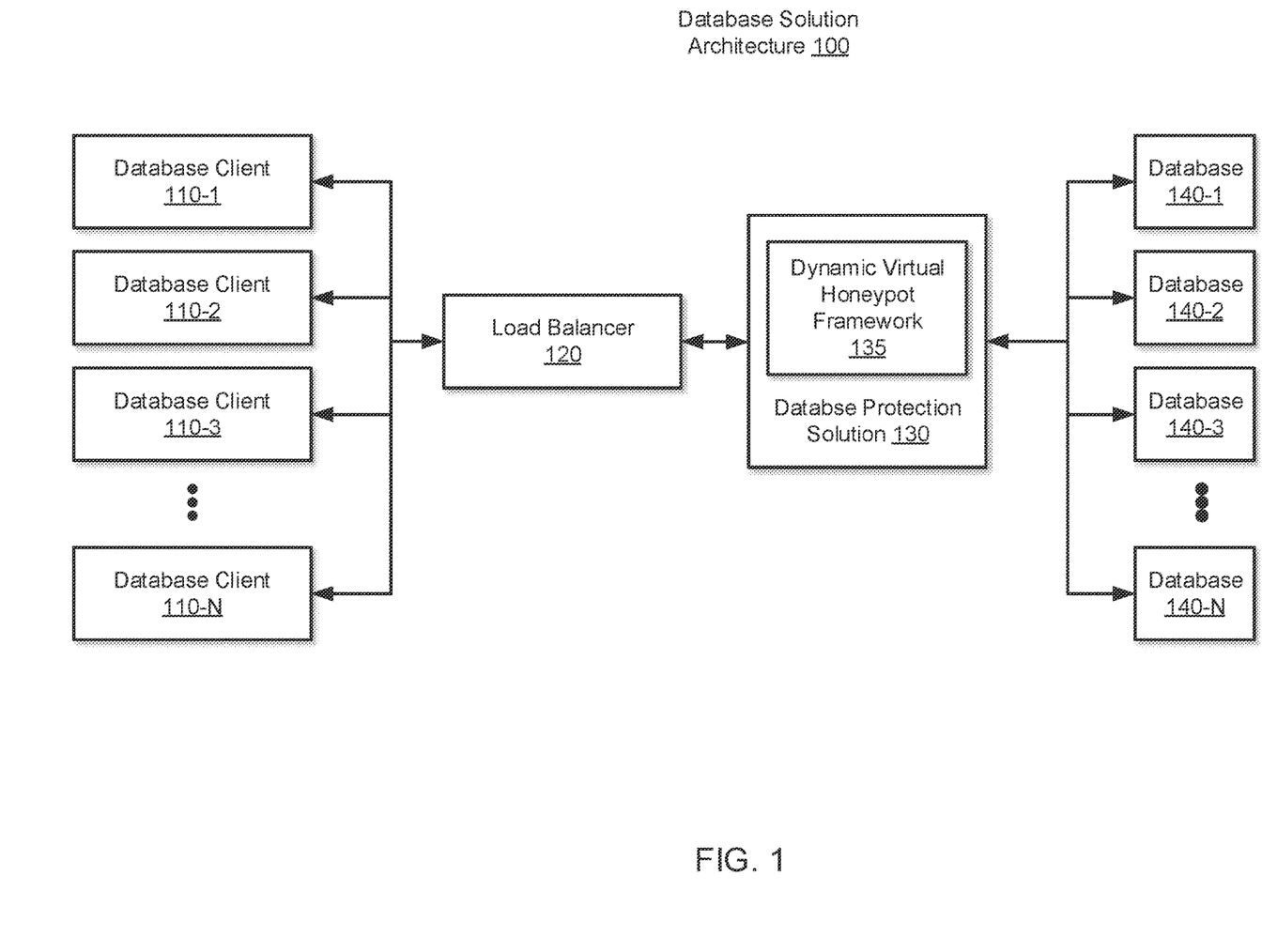
FIG. 1 is a block diagram illustrating an overall database solution architecture used by one or more embodiments of the present disclosure.

FIG. 1 is a block diagram illustrating a database solution architecture 100 configured to manage and maintain data and documents, in accordance with embodiments of the present disclosure. The database solution architecture 100 includes database client 110-1, 110-2, 110-3, 110-N (collectively "database clients 110") where N is a variable integer representing any number of possible database clients 110, a load balancer 120, a database protection solution 130, and a database 140-1, 140-2, 140-3, 140-N (collectively "databases 140") where N is a variable integer representing any number of possible databases 140. The database protection solution 130 includes a dynamic virtual honeypot framework 135.

The database solution architecture 100 shown in FIG. 1 can address issues such as the following problem. Assume that database client 110-1 transmits a database query request to the database 140. The load balancer 120 initially routes that request to the database protection solution 130. That query request can be flagged as suspicious by the database protection solution 130 while also letting the database 140 retrieve the response. The database protection solution 130 can determine that the query request is an attack on the database 140 by evaluating a variety of information. The information includes, but is not limited to, the session information between the database client 110-1, the query request, the response, and any other additional information relating to the session. Once determined to be an attack, the dynamic virtual honeypot framework 135 can mask the information in the response by replacing the actual information with artificial information while maintaining the same format as the original response. Additionally, a honey token can be generated and inserted into the artificial response. The artificial response can then be transmitted to the database client 110-1 as the response to their query request.

The database clients 110 are components of the database solution architecture 100 configured to access services provided by the database 140 as part of a client-server model. The database clients 110 can communicate with the database 140 over a network to transmit database query requests and receive the corresponding responses. The types of networks include, but are not limited to, a local-area network, wireless network, the Internet, public switch telephone network, a radio access network, and other networks. The other networks include wired or wireless communication networks owned and/or operated by network service providers.

The load balancer 120 is a component of the database solution architecture 100 configured to distribute the workload between the database clients 110 and the databases 140. The load balancer 120 can act as a single database endpoint for applications operated by the database clients 110 to connect to, increase query throughput, minimize latency, and maximize resource utilization of the database servers.

In some embodiments, the load balancer 120 works on the Transmission Control Protocol (TCP)/User Datagram Protocol (UDP), where the communication between the database clients 110 and the databases 140 happens on an intermediate level between application and Internet Protocol (IP). The TCP load balancing can provide error check streams of packets. Additionally, the load balancer 120 can utilize various methods algorithms to distribute the workloads. These algorithms include, but are not limited to, round-robin, weight-based load balancing, and least connection. For example, in weight-based load balancing, each database 140 is pre-assigned a weight, which the proportion of traffic that it can handle relative to other databases 140. The weight can indicate the capacity a particular database 140 has in comparison to the other databases 140. A higher weight can indicate that a server can handle more requests and vice versa.

The database protection solution 130 is a component of the database solution architecture 100 configured to provide security for the databases 140. The database protection solution 130 can analyze database access of the database clients 110 by monitoring the network or local access to the databases 140 to identify suspicious behavior. The database protection solution 130 can include various components that make up its security mechanism. These components include, but are not limited to, a protocol analyzer module, a statement/commands parser, a policy validation module, and an alert module. The security mechanism is configured to examine the requests and the responses. For example, a database query that is sent by the database client 110-1 to the database 140-1 is extracted from the database protocol packets intercepted by the database protection solution 130. The security mechanism can then parse the query up to a database object level, validate the query against one or more security policies for potential database object access violations, and issue an appropriate alert if an access violation is detected. The database protection solution 130 is also configured to suspend sessions between database clients 110 and databases 140 when a security anomaly or violation is detected.

The dynamic virtual honeypot framework 135 is a component of the database protection solution 130 configured to implement a dynamic virtual database honeypot. The dynamic virtual honeypot framework 135 can relay a query request received from a database client 110 to a database 140. The relay allows the dynamic virtual honeypot framework 135 to receive, from the database 140, a response relating to the query request. Once received, database protection solution 130 can determine whether the query request is an attack on the database. The session information, the query request, and the response can all be used in making the determination.

The dynamic virtual honeypot framework 135 is further configured to generate a honey token based on information contained within the response and to generate an alternate response formatted in the same format as the response and containing artificial information that masks the information contained within the response. Once created, the honey token can be inserted into the alternate response and transmitting the alternate response to the database client. The dynamic virtual honeypot framework 135 is described in greater detail below (see FIG. 2).

The databases 140 are components of the database solution architecture 100 configured to manage an organized collection of information, or data, typically stored electronically in a computer system. The databases 140 can be either a relational database or a non-relational database. Relational databases use a structure (e.g., a table) that allows users to identify and access data in a relation to other pieces of data in the database. Non-relational databases do not use a tabular scheme of rows and columns found in relational databases. Instead, non-relational databases use a storage model that is optimized for specific requirements of the type of data being stored.

The databases 140 can be queried to create, update, delete, and retrieve the data. Relational databases typically store data in the form of tables that consist of rows and columns. The tables can have relationships with other tables to depict the actual data relationships. For example, a school may have a student table related to a course table. Prior to storing data in a relational database, the data is structured to match a schema to allow for information to be easily identified and retrieved.

Non-relational databases store unstructured and semi-structured data without enforcing a structure to the data before being stored. The data stored in non-relational databases can vary depending on the provider, but generally, data is stored as documents instead of tables. An example of this would be databases for inventory management, where different products have different attributes and, therefore, require a flexible structure. Similarly, an analytics database that stores data from different sources in different structures.

For example, a non-relational database may be implemented by one or more non-relational, i.e., non-SQL, types of database management systems. Examples of non-relational database management systems include MongoDB, Oracle, NoSQL, BaseX, Clusterpoint, eXist, Jackrabbit, OrientDB, Sedna, SimpleDB, and the like.

Each type of database management system organizes stored information differently than each other type. As a result, queries to each of the different types produce results with different content. For example, a query to a relational database, e.g., to a MySQL database, may return a field, i.e., an item of data. By contrast, a query to a document-oriented database, e.g., MongoDB, may return an object having a piece of data and instructions for what to do with the data. The object returned by MongoDB may be used to retrieve its associated data (which may be similar to the field returned by the relational database query). However, some translation and additional processing are typically needed in order to retrieve similar information from the different types of database management systems.

It is noted that FIG. 1 is intended to depict the major representative components of an exemplary database solution architecture 100. In some embodiments, however, individual components may have greater or lesser complexity than as represented in FIG. 1, components other than or in addition to those shown in FIG. 1 may be present, and the number, type, and configuration of such components may vary.

Figure 2:
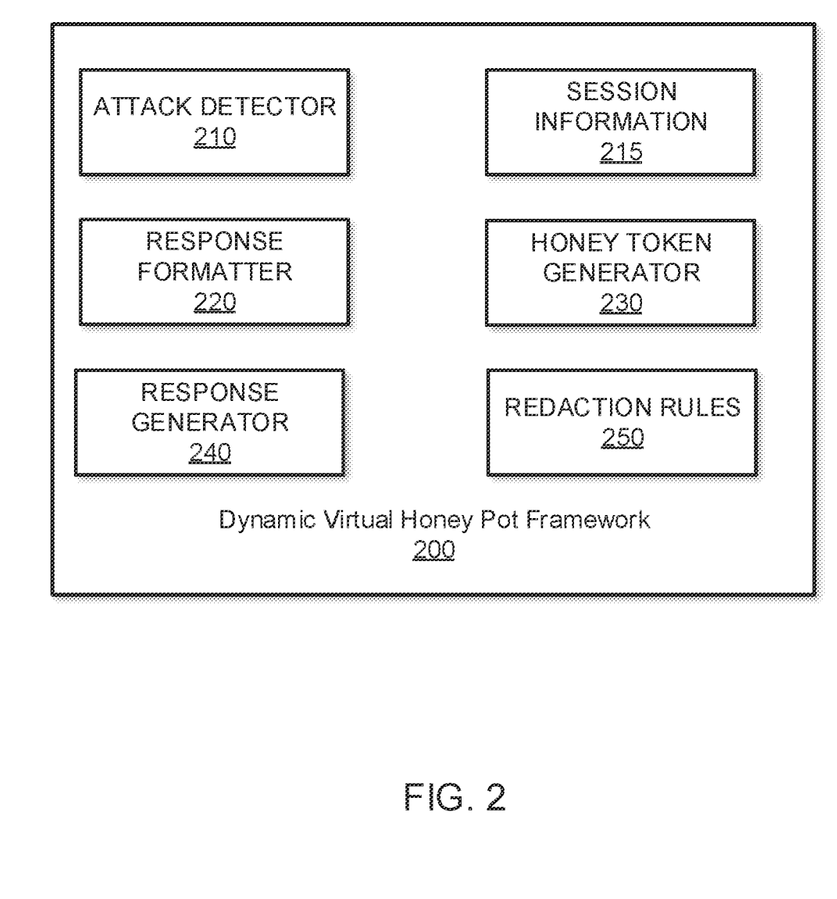
FIG. 2 is a block diagram illustrating a dynamic virtual honey pot framework used by one or more embodiments of the present disclosure.

FIG. 2 is a block diagram illustrating a dynamic virtual honeypot framework 200 (analogous to the dynamic virtual honeypot framework 135), in accordance with embodiments of the present disclosure. The dynamic virtual honeypot framework 200 includes an attack detector 210, session information 215, a response formatter 220, a honey token generator 230, and a response generator 240, and redaction rules 250.

The attack detector 210 is a component of the dynamic virtual honeypot framework 200 configured to detect suspicious behavior between the database clients 110 and the databases 140. The attack detector 210 the query requests and response between the database clients 110 and the databases 140 and determine whether an attack is occurring. These attacks include, but are not limited to, Structure Query Language (SQL) attacks, SQL injection attacks, and stored injection attacks.

The attack detector 210 can utilize various defenses such as validation functions, web application firewalls, and prepared statements in detecting potential attacks. These defenses can inspect the communication and sanitize the statements that are considered dangerous. Some defenses and mechanisms can monitor and block query requests that deviate from specific models while also inspecting how the requests are processed by the database 140. Additionally, the attack detector 210 can utilize the session information 215 generated between a database client 110 and a database 140 when a connection occurs.

A session represents the connection between the database client 110 and the database 140 that stores its persistent objects. The session information 215 can include information such as the state of the cache, the state of a unit of work, debugging statements, exception/error messages generated by either the database client 110 or the database 140, and any other output sent to a system log during the session.

The response formatter 220 is a component of the dynamic virtual honeypot framework 200 configured to determine a format of the alternate response. Query requests can include several language elements that can be used to retrieve specific information formatted in a particular way. These elements include, for example, clauses, expressions, predicates, queries, statements, and white space. Expressions, for example, can produce either scalar values or tables consisting of columns and rows of data. Predicates can specify conditions that can be evaluated as being true, false, or unknown and are used to limit the effects of statements and queries.

In some embodiments, the response formatter 220 can analyze a query request transmitted from a database client 110 and determine what the format would be for the corresponding response. For example, a query clause requesting multiple tables would have a response that contains information from multiple tables. In some embodiments, the response formatter 220 analyzes the response received from the database 140. For example, a query request determined as an attack is relayed to a database 140. The database 140 can transmit back a corresponding response in a particular format. The response formatter can analyze the response and determine the format of the response so that the same format can be used in the alternate response.

The honey token generator 230 is a component of the dynamic virtual honeypot framework 200 configured to generate honey tokens. A honey token can be a fictitious input such as a word or record that can be added to a response. A honey token can allow an administrator to track the data in situations that are normally not trackable, such as cloud-based networks. If data is stolen, the honey token can also allow an administrator to identify the database 140 it was stolen from and how the information was leaked and/or stolen. For example, if honey tokens are placed into medical records, different honey tokens can take the form of fake medical records with different honey tokens for each set of medical records available in a database 140.

The honey token generator 230 honey tokens can take many forms. These forms include, for example, a dead or fake account to a database entry that would only be selected by malicious queries, fake email addresses, fake identities, workable credentials specifically created for the honey token, fake database data, fake executable files, web beacons, browser cookies, canary traps, and services keys. For example, a canary trap can be information placed inside a file that someone who wants to leak the information will be attracted to. As an example, the honey token can be put into a fake accounting spreadsheet that appears to reveal secret information about a company's finances.

In some embodiments, the honey token generator 230 generates honey tokens based on a honey token generation policy. The honey token generation policy can dictate the type of honey token to be used and the applicable circumstances when a honey token may be used. For example, some organizations may only want to use fake email addresses as honey tokens, and that honey token email addresses may only be used under certain predefined conditions. The honey token generation policy may also dictate times and geographical locations for which honey tokens may be used. For example, the policy may dictate that honey tokens can only be generated on the weekends and may be set to a certain geographical region such as an Asia/Pacific region or European region. In some embodiments, the honey token generation policy may also dictate the type of honey token used based on the query request and response. For example, a response containing many email addresses may be better suited with a honey token disguised as an email address. The honey token generation policy may also restrict the usage of a honey token for specific information such as sensitive information.

The response generator 240 is a component of the dynamic virtual honeypot framework 200 configured to mask data within the response by replacing the data with artificial information. The response generator can analyze the information within the response and replicate that information so as to mimic the format but replace the value. For example, the query response may contain the name "John Smith" with a social security number of "123-45-6789". The dynamic virtual honeypot framework can mask that information by changing the value but keeping the format the same such that the name is changed to "Tina Thompson" with a social security number of "444-55-0092". The artificial information maintains the format to convince the attacker that they have legitimate information.

The response generator 240 is further configured to generate an alternate response by utilizing the format the response formatter 220 determined and populating that format with artificial information based on the response retrieved from the database 140. For example, based on the query request, the response should be a table with three rows and fifteen columns, then the alternate response will be a table with three rows and fifteen columns. The response generator 240 can also analyze the information populating the table to determine the type of artificial information to generate. If the response contains names, then artificial names can be generated. If the response includes email addresses, then artificial email addresses can be generated, and so on. The response generator 240 can analyze all data values in the response and replace that information with artificial information, thereby masking the original information in the response.

In some embodiments, the response generator 240 masks information within the response based on a set of redaction rules. For example, the redaction rules may dictate that no sensitive information within the response can be transmitted out to the database client 110. Sensitive information can include information concerning an organization's or an affiliate's prospective, current, or former customers, clients, vendors, employees, or any other nonpublic business information. Sensitive information, or sensitive data, can also be information whose disclosure is protected by law or regulation as well as organizational policies. This can include confidential information and personally identifiable information (PII), which can be an individual's name in conjunction with an identifier or account number and whose compromise could lead to identity theft or fraud.

PII can be any data that can be linked to an individual and, if released, could result in harm to the person. Examples of such information include social security numbers, passport numbers, biometric information, medical data, and personally identifiable financial information. Business information can relate to any data that would cause damage to a company if accessed by a competitor or the public. This can include financial data, trade secrets, supplier information, customer data, and the like.

Additionally, the set of redaction rules can also dictate a percentage of artificial information that is required within the alternate response. For example, a redaction rule may dictate that at least 75% of the original response must be converted to artificial information prior to transmitting back to the database client 110. The percentage can be preset by an administrator and can also be based on the type of information being transmitted in the response. For example, the redaction rules can dictate that 100% of the information must be redacted and replaced with artificial information if the information within the response pertains to medical information. In another instance, the redaction rules can dictate that only 50% of the information must be redacted and replaced with artificial information if the information within the response pertains to general information such as inventory, customer information, satisfaction surveys, and the like.

It is noted that FIG. 2 is intended to depict the major representative components of an exemplary dynamic virtual honey pot framework 200. In some embodiments, however, individual components may have greater or lesser complexity than as represented in FIG. 2, components other than or in addition to those shown in FIG. 2 may be present, and the number, type, and configuration of such components may vary.

Figure 3:
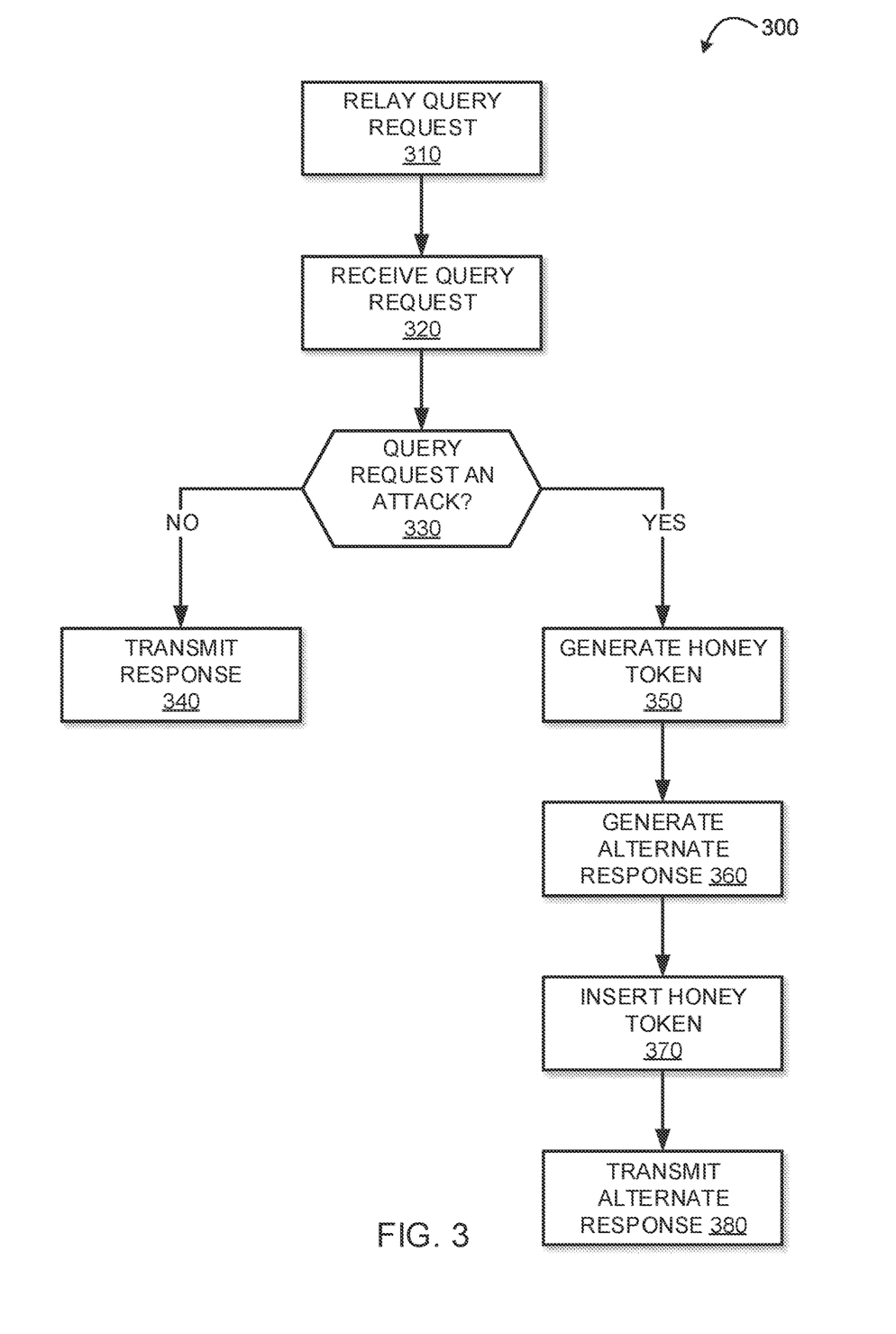
FIG. 3 is a flow diagram illustrating a process of implementing a dynamic virtual honeypot database and performed in accordance with embodiments of the present disclosure.

FIG. 3 is a flow diagram illustrating a process 300 of implementing a dynamic virtual database honeypot, in accordance with embodiments of the present disclosure. A query request from a database client 110 is relayed to a corresponding database 140 via the dynamic virtual honeypot framework 200. This is illustrated at step 310. Compared to traditional database honeypots, which require the identification of an attack in the query request stage so that the query request can be redirected to the honey pot, the dynamic virtual honey pot framework 200 defers the decision to the response receiving stage. Precision in the response is improved when injecting the honey token because the dynamic virtual honey pot framework 200 can analyze both the query request and the corresponding response before providing the alternate response.

The dynamic virtual honeypot framework 200 receives the corresponding response from the database 140. This is illustrated at step 320. An analysis can then be performed to determine whether the query request is an attack, an anomaly, or a type of suspicious behavior that violates one or more security policies set by the database protection solution 130. The attack detector 210 and/or the database protection solution 130 can determine if the query request amounts to an attack. This is illustrated at step 330. If the query request is deemed to be an ordinary request that is not suspicious, then the original response from the database 140 is transmitted to the database client 110 and the process 300 is complete. This is illustrated at step 340. However, if database protection solution 130 and/or the attack detector 210 detect that the query request is an attack, then the process 300 proceeds to step 350.

The honey token generator 230 generates a honey token for an alternate response. This is illustrated at step 350. A honey token can be a fictitious input such as a word or record that can be added to a response. Based on the information within the response, the honey token generator 230 selects an entry to mimic and use as the honey token. The response formatter 220 can determine a format of the response produced by the database. Based on the format, an entry can be selected within the response to replace. For example, the honey token generator 230 can select a phone number entry to replace and generate a honey token in the form of a phone number with the same format In some embodiments, the honey token generator 230 generates honey tokens based on a honey token generation policy. The honey token generation policy can dictate the type of honey token to be used and the applicable circumstances when a honey token may be used. For example, some organizations may only want to use fake email addresses as honey tokens, and that honey token email addresses may only be used under certain predefined conditions. The honey token generation policy may also dictate times and geographical locations for which honey tokens may be used. For example, the policy may dictate that honey tokens can only be generated on the weekends and may be set to a certain geographical region such as an Asia/Pacific region or European region.

The response generator 240 generates the alternate response. This is illustrated at step 360. The response generator 240 can generate the alternate response by utilizing the format the response formatter 220 determined and by populating that format with artificial information based on the response retrieved from the database 140. The artificial information can mimic the entries contained within the response. For example, based on the query request, the response is a table including a first column being employee identifications, a second column with names, and a third column with job titles. Based on that information, the alternate response will also include a table with a first column being employee identifications, a second column with names, and a third column with job titles. The response generator 240 can also analyze the information populating the table to determine the type of artificial information to generate. If the response contains names, then artificial names can be generated. If the response includes email addresses, then artificial email addresses can be generated, and so on. The response generator 240 can analyze all data values in the response and replace that information with artificial information, thereby masking the original information in the response.

In some embodiments, the response generator 240 masks information within the response based on a set of redaction rules. For example, the redaction rules may dictate that no sensitive information within the response can be transmitted out to the database client 110. Additionally, the set of redaction rules can also dictate a percentage of artificial information that is required within the alternate response. For example, a redaction rule may dictate that at least 75% of the original response must be converted to artificial information prior to transmitting back to the database client 110. The percentage can be preset by an administrator and can also be based on the type of information being transmitted in the response. For example, the redaction rules can dictate that 100% of the information must be redacted and replaced with artificial information if the information within the response pertains to medical information.

The honey token is inserted into the alternate response. This is illustrated at step 370. The honey token can take the place of any entry within the alternate response that matches the format of the honey token. For example, if the honey token is an email address, then the honey token can replace any email address within the alternate response. In some embodiments, multiple honey tokens are inserted into the alternate response. The honey tokens can be the same type, such as multiple names or emails. The honey tokens can also be of different types. For example, one honey token can be an email address, while another honey token can be a workable credential that is both inserted into the alternate response. Once inserted, the alternate response is transmitted to the database client. This is illustrated at step 380.

Figure 4:
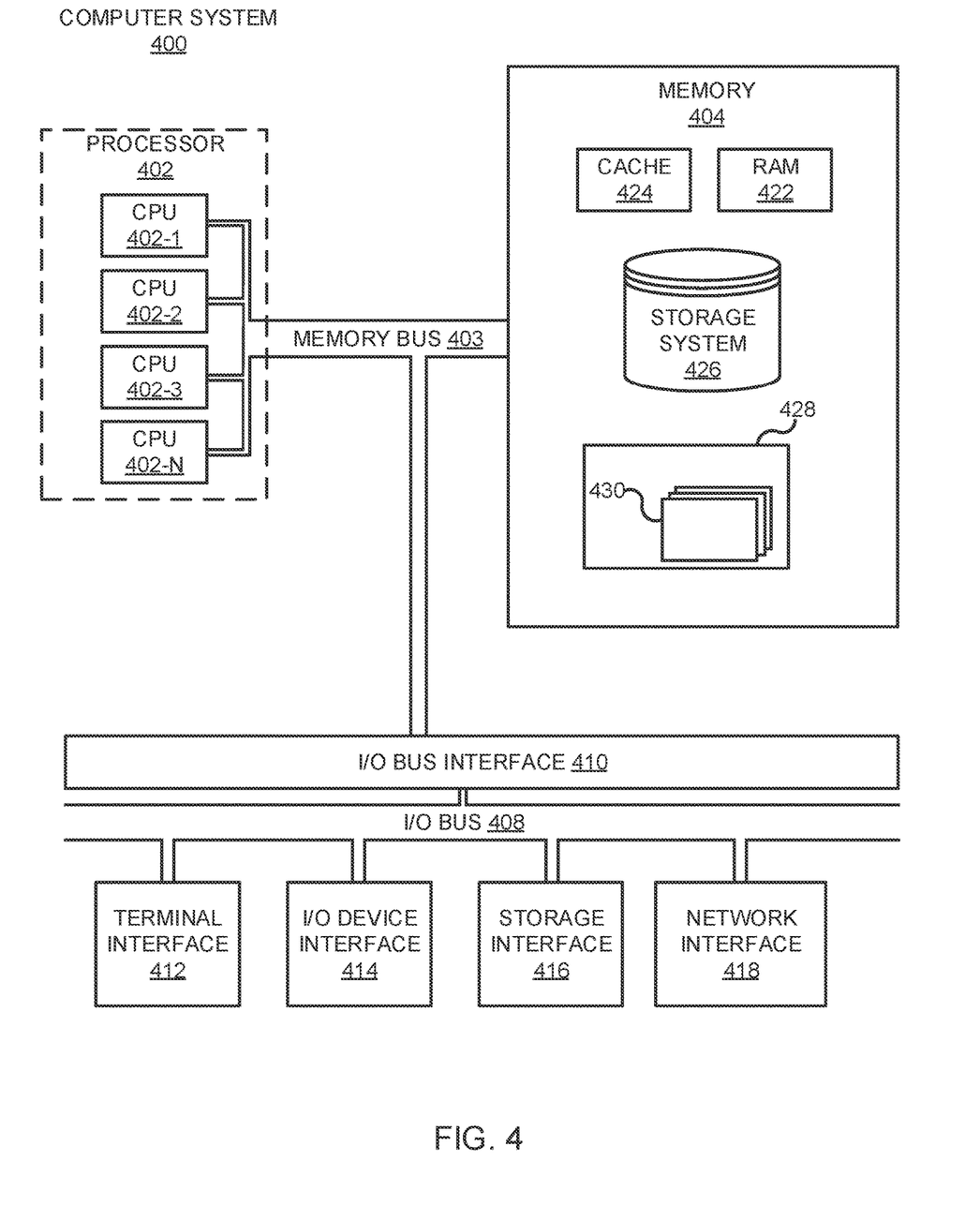
FIG. 4 is a high-level block diagram illustrating an example computer system that may be used in implementing one or more of the methods, tools, and modules, and any related functions, described herein in which the disclosure may be implemented.

Referring now to FIG. 4, shown is a high-level block diagram of an example computer system 400 (e.g., the dynamic virtual honeypot framework 200) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 400 may comprise one or more processors 402, a memory 404, a terminal interface 412, an I/O (Input/Output) device interface 414, a storage interface 414, and a network interface 418, all of which may be communicatively coupled, directly or indirectly, for inter-component communication via a memory bus 403, an I/O bus 408, and an I/O bus interface 410.

The computer system 400 may contain one or more general-purpose programmable central processing units (CPUs) 402-1, 402-2, 402-3, and 402-N, herein generically referred to as the processor 402. In some embodiments, the computer system 400 may contain multiple processors typical of a relatively large system; however, in other embodiments, the computer system 400 may alternatively be a single CPU system. Each processor 402 may execute instructions stored in the memory 404 and may include one or more levels of onboard cache.

The memory 404 may include computer system readable media in the form of volatile memory, such as random-access memory (RAM) 422 or cache memory 424. Computer system 400 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

Although the memory bus 403 is shown in FIG. 4 as a single bus structure providing a direct communication path among the processors 402, the memory 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 400 may, in some embodiments, contain multiple I/O bus interface units, multiple I/O buses, or both. Further, while multiple I/O interface units are shown, which separate the I/O bus 408 from various communications paths running to the various I/O devices, in other embodiments, some or all of the I/O devices may be connected directly to one or more system I/O buses.

In some embodiments, the computer system 400 may be a multi-user mainframe computer system, a single-user system, or a server computer or similar device that has little or no direct user interface but receives requests from other computer systems (clients). Further, in some embodiments, the computer system 400 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the major representative components of an exemplary computer system 400. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 (e.g., the dynamic virtual honey pot framework 200), may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and P.D.A.s).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 5:
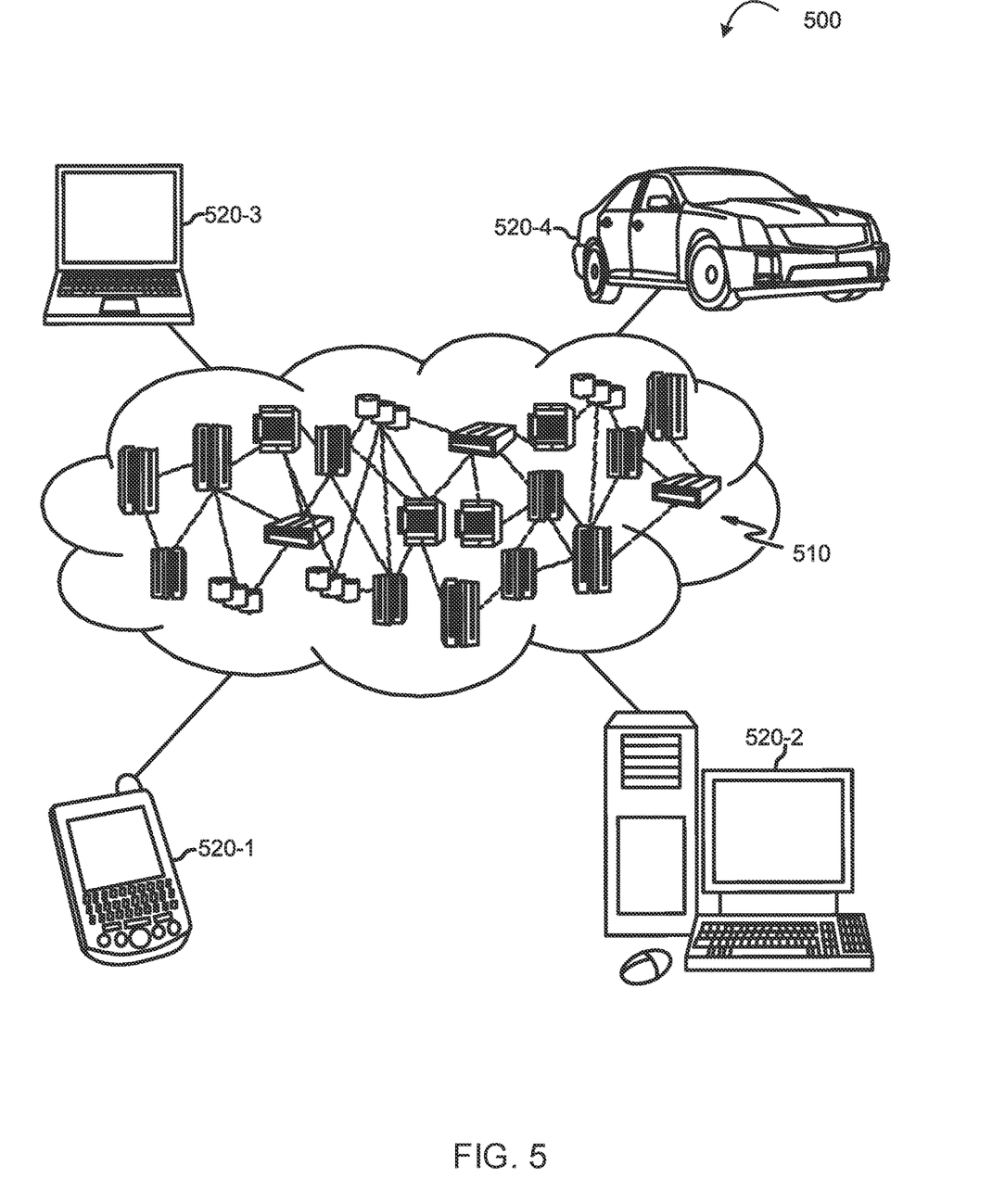
FIG. 5 depicts a cloud computing environment in accordance with embodiments of the present disclosure.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (P.D.A.) or cellular telephone 520-1, desktop computer 520-2, laptop computer 520-3, and/or automobile computer system 520-4 may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 520-1 to 520-4 shown in FIG. 5 are intended to be illustrative only and that computing nodes 510 and cloud computing environment 500 can communicate with any type of computerized device over any type of network and/or network addressable connection (e.g., using a web browser).

Figure 6:
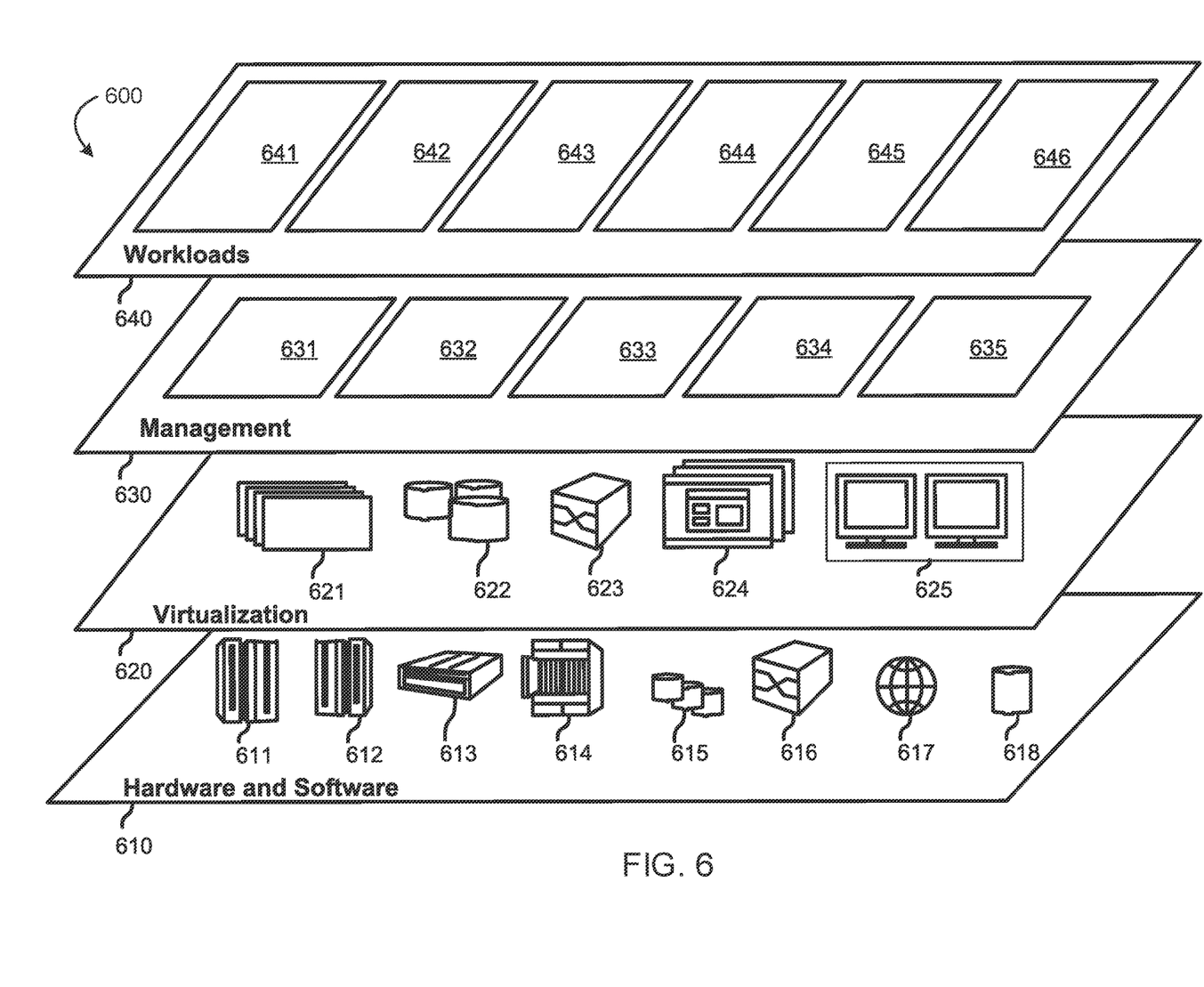
FIG. 6 depicts abstraction model layers in accordance with embodiments of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 610 includes hardware and software components. Examples of hardware components include mainframes 611; RISC (Reduced Instruction Set Computer) architecture-based servers 612; servers 613; blade servers 614; storage devices 615; and networks and networking components 616. In some embodiments, software components include network application server software 617 and database software 618.

Virtualization layer 620 provides an abstraction layer from which the following examples of virtual entities may be provided: virtual servers 621; virtual storage 622; virtual networks 623, including virtual private networks; virtual applications and operating systems 624; and virtual clients 625.

In one example, management layer 630 may provide the functions described below. Resource provisioning 631 provides dynamic procurement of computing resources and other resources that are utilized to perform tasks within the cloud computing environment. Metering and Pricing 632 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 633 provides access to the cloud computing environment for consumers and system administrators. Service level management 634 provides cloud computing resource allocation and management such that required service levels are met. Service Level Agreement (S.L.A.) planning and fulfillment 635 provide pre-arrangement for, and procurement of, cloud computing resources for which a future requirement is anticipated in accordance with an S.L.A.

Workloads layer 640 provides examples of functionality for which the cloud computing environment may be utilized. Examples of workloads and functions which may be provided from this layer include mapping and navigation 641; software development and lifecycle management 642 (e.g., the dynamic virtual honey pot framework 200); virtual classroom education delivery 643; data analytics processing 644; transaction processing 645; and a threat similarity analysis system 646.

The present disclosure may be a system, a method, and/or a computer program product at any possible technical detail level of integration. The computer program product may include a computer-readable storage medium (or media) having computer readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of implementing a dynamic virtual database honeypot, the computer-implemented method comprising:
   relaying a query request received from a database client to a database;
   receiving, from the database, a response relating to the query request;
   determining the query request is an attack on the database based on session information relating to the database and the database client;
   generating a honey token based on information contained within the response;
   generating an alternate response formatted in a same format as the response and containing artificial information that masks the information contained within the response;
   inserting the honey token into the alternate response that contains the masked information; and
   transmitting the alternate response to the database client.

2. The computer-implemented method of claim 1, wherein generating the honey token comprises:
   determining a format of the response produced by the database;
   selecting an entry within the response to replace; and
   generating the honey token that mimics the entry and the format, wherein the honey token is based a generation policy.

3. The computer-implemented method of claim 2, wherein the generation policy dictates a type of honey token to be used.

4. The computer-implemented method of claim 1, wherein generating the alternate response comprises:
   determining a format of the response;
   generating artificial information that mimic on entries contained within the response, wherein the artificial information is dictated by a set of redaction rules; and
   creating, by formatting the artificial information in the format of the response, the alternate response.

5. The computer-implemented method of claim 4, wherein the redaction rules indicates the information within the response that requires masking and replacement with artificial information.

6. The computer-implemented method of claim 1, further comprising:
   generating a second honey token based on the information contained within the response; and
   inserting the second honey token into the alternate response prior to transmitting the alternate response.

7. The computer-implemented method of claim 1, wherein the honey token is a workable credential designed for an attacker to use.

8. A computer program product including computer readable storage media of implementing a dynamic virtual database honeypot, having computer executable instructions that when executed by at least one computer cause the at least one computer to execute the instructions to:
   relay a query request received from a database client to a database;
   receive, from the database, a response relating to the query request;
   determine the query request is an attack on the database based on session information relating to the database and the database client;
   generate a honey token based on information contained within the response;

generate an alternate response formatted in a same format as the response and containing artificial information that masks the information contained within the response;

insert the honey token into the alternate response that contains the masked information; and transmit the alternate response to the database client.

9. The computer program product of claim 8, wherein generate the honey token comprises instruction to:

determine a format of the response produced by the database;

select an entry within the response to replace; and generate the honey token that mimics the entry and the format, wherein the honey token is based a generation policy.

10. The computer program product of claim 9, wherein the generation policy dictates a type of honey token to be used.

11. The computer program product of claim 8, wherein generating the alternate response comprises instructions to:

determine a format of the response;

generate artificial information that mimic on entries contained within the response, wherein the artificial information is dictated by a set of redaction rules; and create, by formatting the artificial information in the format of the response, the alternate response.

12. The computer program product of claim 11, wherein the redaction rules indicates the information within the response that requires masking and replacement with artificial information.

13. The computer program product of claim 8, further comprising instructions to:

generate a second honey token based on the information contained within the response; and insert the second honey token into the alternate response prior to transmitting the alternate response.

14. The computer program product of claim 8, wherein the honey token is a workable credential designed for an attacker to use.

15. A system for implementing a dynamic virtual database honeypot, the system comprising:

a memory;

a processor;

local data storage having stored thereon computer executable code, wherein the computer executable code includes the program instruction executable by a processor to cause the processor to perform a method, the method comprising:

relaying a query request received from a database client to a database;

receiving, from the database, a response relating to the query request;

determining the query request is an attack on the database based on session information relating to the database and the database client;

generating a honey token based on information contained within the response;

generating an alternate response formatted in a same format as the response and containing artificial information that masks the information contained within the response;

inserting the honey token into the alternate response that contains the masked information; and transmitting the alternate response to the database client.

16. The system of claim 15, wherein generating the honey token comprises:

determining a format of the response produced by the database;

selecting an entry within the response to replace; and generating the honey token that mimics the entry and the format, wherein the honey token is based a generation policy.

17. The system of claim 16, wherein the generation policy dictates a type of honey token to be used.

18. The system of claim 15, wherein generating the alternate response comprises:

determining a format of the response;

generating artificial information that mimic on entries contained within the response, wherein the artificial information is dictated by a set of redaction rules; and creating, by formatting the artificial information in the format of the response, the alternate response.

19. The system of claim 18, wherein the redaction rules indicates the information within the response that requires masking and replacement with artificial information.

20. The system of claim 15, further comprising:

generating a second honey token based on the information contained within the response; and inserting the second honey token into the alternate response prior to transmitting the alternate response.

* * * * *